Patented Sept. 2, 1952

UNITED STATES PATENT OFFICE 2,609,290

METHOD OF STRIPPING PHOTOGRAPHIC EMULSIONS

Jacob Quentin Umberger, Holmdel, and Arthur William Grumbine, Parlin, N. J., assignors to E. I. du Pont de Nemours & Company, Wilmington, Del., a corporation of Delaware No Drawing. Application May 17, 1948, Serial No. 27,607

12 Claims. (Cl. 95—2)

This invention relates to photography and more particularly to a process for insolubilizing stripping layers in photographic films. Still more particularly it relates to a process for transferring an image-bearing layer from a stripping film to another support which involves insolubilization and resolubilization of the stripping layer.

Photographic stripping films are described in copending Jennings application Serial No. 651,996 filed March 5, 1946 now U. S. Patent No. 2,462,503. The stripping films of that application constitute the front film (A) of a bipack. The stripping layer which is disposed between two gelatino silver halide emulsion layers is composed essentially of a water-soluble macromolecular acetal of a hydroxyl polymer containing a plurality of recurring intralinear $$-CH_2-\overset{|}{C}HOH$$

or vinyl alcohol units. These acetals are water-soluble by virtue of the fact that the hydrocarbon nucleus which is linked to the hydroxyl polymer nucleus through an acetal linkage has a hydrogen atom substituted by a group taken from the class consisting of COOZ and $SO_3Z$ groups wherein Z is a hydrogen atom or a water-soluble cation, e. g., alkali metal, ammonium or an amine salt group.

The stripping films just described are used in conjunction with the rear film (B) of a bipack which consists of a transparent film base carrying a light-sensitive gelatino silver halide emulsion layer. This layer is generally sensitive to green or red light. In using the bipack film, the respective emulsion surfaces of the front film (A) and the rear film (B) are placed in contact and disposed in a camera so that the front film is first exposed through the base. The two films are then developed whereby three-color separation records are formed in the respective light-sensitive emulsion layers of the bipack element. The color separation records of the front film (A) in one practical use are developed, fixed and washed, and rolled into contact with the gelatin layer of a gelatin-blank film. The outer image-bearing layer of the front film being adherent to the gelatin-blank film is then stripped from the lower image-bearing layer. The gelatin-blank film should, of course, be placed in registration contact with the emulsion layer to be transferred. Color prints made from (1) the separated, developed records of the front film and (2) the rear film can then be superimposed in register on a transparent support whereby a positive multi-color picture is formed or the separation records can be used for printing purposes. The stripping films of the aforementioned application while commercially feasible have the disadvantage that the stripping layers dissolve or loosen during the washing step after development and fixation. Hence, the stripping action should be carried out immediately after the photographic processing has been completed. This sometimes is disadvantageous since it is often desirable to strip continuous links of motion picture film at a rate different from that at which the film passes through the continuous developing and fixing machine. Furthermore, it is sometimes inconvenient to conduct a stripping operation in the same area as the continuous developing machine.

An object of this invention is to provide a method for insolubilizing the water-soluble stripping layer of a stripping film. Another object is to provide a method for insolubilizing such a layer and later resolubilizing it so that stripping can be accomplished. A further object is to provide a simple and economical method for delaying the stripping action of a water-soluble polyvinyl acetal stripping layer. Still other objects will be apparent from the following description of the invention.

It has been found that stripping layers in films of the type referred to and disclosed above can be insolubilized by treating them with an aqueous solution containing a water-soluble inorganic polyvalent metal gelatin-hardening agent which yields metal cations in solution having a valence of 3 to 4, including the salts of aluminum, chromium, iron, thorium, zirconium, titanium, cerium and vanadium, e. g., the chlorides, bromides, acetates, sulfates and mixed salts such as potassium aluminum sulfate, iron ammonium sulfate, before or after development or fixation, but prior to any extended washing in water. The hardening agents apparently form a complex with the water-soluble macromolecular polyvinyl acetal sulfonic or carboxylic acid compounds and insolubilize the same. The acetals are polyelectrolytes of the anionic type and possibly form a polyvalent or complex salt with the metal of the hardening agent. However, regardless of the theoretical explanation, the layer becomes insoluble and no dissolving or loosening of the layer occurs during the normal washing steps.

The insolubilization can be accomplished by treatment of the polyvinyl acetal in the coating solution prior to making the layer or after the element is made. It is preferably carried out during the processing of the element to form a visible image and after exposure. The original light-sensitive layers thus are preferably image-bearing, that is, they contain a latent image or a developed image before the stripping layer is insolubilized. The insolubilization treatment is preferably carried out during or after fixing but prior to washing.

The layers can be later reconverted into stripping layers which are readily strippable in water by treating the film element in an aqueous treating bath containing an anionic surface active wetting agent and having a pH of about 1.0 to 4.5.

In the preferred aspect of the invention, a stripping film containing two light-sensitive silver halide gelatin emulsion layers which are separated by a cold water-soluble stripping layer predominating in a sodium o-sulfobenzaldehyde acetal of a hydroxyl polymer containing a plurality of recurring $$-CH_2-\overset{|}{C}HOH$$

groups as polymer forming units is insolubilized by means of an aluminum chloride aqueous solution and resolubilized just before it is desired to effect stripping by means of an aqueous solution of a sodium salt of an alkyl sulfate of 8 to 18 carbon atoms or a mixture of such salts.

When the insolubilization has been carried out to an excessive degree by aging of the film or by an excess of the aforedescribed insolubilizing metal hardening agent, it is advisable to add polyvalent metal ion sequestering agents to the aqueous solution of the anionic wetting agent. Suitable sequestering agents include α-hydroxy aliphatic carboxylic acids, e. g., glycolic, lactic, citric, and tartaric; oxalic acids and water-soluble salts thereof, e. g., sodium, potassium, etc.

The invention will be further illustrated but is not intended to be limited by the following examples:

EXAMPLE I

A cellulose nitrate film base having a thin gelatin coating was coated to a weight of 52 mg. AgBr per sq. dec. with a gelatino-silver iodobromide emulsion which had admixed therewith 50% by weight based on the silver salt of yellow colloidal silver. A mixture of 100 parts of 100% hydrolyzed polyvinyl acetate (medium viscosity-molecular weight 15,000 to 20,000), 1,080 parts ethylene glycol, 73 parts of sodium-o-sulfobenzaldehyde monohydrate, and 9 parts 100% phosphoric acid is stirred at 80° C. for 1 hour and then precipitated with 10,000 parts acetone and dried to give 142 parts of a white solid. A solution containing 50 grams of this acetal per 1,000 grams of a 10% ethanol, 90% water solution was digested 45 minutes at 125° F., cooled to 90° F., neutralized to pH 7 and coated to form a layer 0.0001 to 0.0003 inch thick. A gelatino-silver iodobromide emulsion containing 1,1′-diethyl-2,2′-cyanine iodide as an ortho-sensitizing dye was coated on the acetal layer to a weight of 48 mg. AgBr per sq. dec. This film element constitutes the front film (A) of a bipack. It may be slit and perforated to form a motion picture film.

A similar film base was coated with thin gelatin substratum and dried. A gelatino-silver iodobromide emulsion containing as a green blind sensitizing dye 1,1′-diethyl-2,4-carbocyanine iodide was coated on the gelatin substratum. It constitutes the rear film of a bipack and may be slit and perforated in like manner to form a motion picture film.

The two films were placed with the gelatin layers in contact and exposed to a color scene and film (A) was processed as follows:

(1) Developed 15 minutes at 68° F. in developer mixed as follows:

| | | |
|---|---|---|
| Water (125° F. or 52° C.) | cc | 500.0 |
| N-p-methylaminophenol sulfate | g | 2.5 |
| Sodium sulfite, desiccated | g | 75.0 |
| Hydroquinone | g | 3.0 |
| Borax, granular | g | 5.0 |

Add cold water to make 1.0 liter.

(2) Fixed 5 minutes at 68° F. in fixer mixed as follows:

| | | |
|---|---|---|
| Water (125° F. or 52° C.) | cc | 750.0 |
| Sodium thiosulfate (Hypo) | g | 240.0 |
| Potassium metabisulfite | g | 24.0 |

Add cold water to make 1.0 liter.

(3) Treated 5 minutes at 68° F. in a bath mixed as follows:

| | | |
|---|---|---|
| Water (125° F. or 52° C.) | cc | 750.0 |
| Sodium sulfate, desiccated | g | 50.0 |
| Aluminum chloride, 32° Bé. solution | cc | 50.0 |
| Borax, granular | g | 10.0 |

Add cold water to make 1.0 liter.

whereby the polyvinyl acetal became insolubilized.

(4) Washed 5 minutes in cold running water.

(5) Dried quickly in warm air dryer.

The above-processed film was perfectly normal in all respects except that the contrast appeared high due to the presence of two image layers. Without the above insolubilization treatment (3), the stripping layer was quite soluble and dissolved in the wash water producing a badly blistered and poorly attached outer emulsion layer.

The outer image bearing layer of element (A) can be transferred to a separate perforated motion picture support consisting of a transparent film base coated with a thin gelatin layer. This light-insensitive film will be hereinafter referred to as a gel-blank. The gelatin layer is preferably coated from a 4 to 10% aqueous gelatin solution containing saponin and a small amount, for example, 10 to 25 cc. of 80% lactic acid per liter. The transfer can be effected in the following manner: The dried element (A) is soaked in a 10% aqueous solution of sodium dodecyl sulfate buffered to a pH of 1.0 to 4.5 for 3 to 5 minutes at 68° to 72° F., pressed into registered contact with the acid gel-blank for about 2 minutes and then the gel-blank with the adhering outer image-bearing layer of film (A) is stripped from the remaining or lower image-bearing layer. The transferred image-bearing layer had excellent anchorage to the gelatin-blank film.

EXAMPLE II (1) A photographic element like that of Example I was exposed to an object field and then developed, fixed, treated, washed and dried in the same five steps referred to in such example. The dried film was soaked with mild agitation for 90 seconds in a transfer bath having a pH of about 3.0 and made up by mixing the following ingredients:

| | Grams |
|---|---|
| Sodium dodecyl sulfate, dry | 50 |
| Monohydrogen disodium phosphate·$12H_2O$ | 15 |
| Citric acid | 18 |

Water to make 1 liter.

(2) The outer layer of the wet film was then rolled into contact with the gelatin surface of an acid gel-blank of the type described in Example I. The resulting film was stripped in like manner. The gel-blank had excellent adherence to the transferred outer image-bearing layer from the film (A). The presence of citric acid in the stripping solution markedly reduced the time necessary to produce stripping. Note in Example I, 3 to 5 minutes of soaking was required.

EXAMPLE III

Stripping films similar to that described in Example I were exposed to an object field and then developed, fixed, treated, washed and treated by the same five procedures of such example.

One sample was soaked for 3 minutes with agitation in water and the outer layer was rolled into contact with the gelatin layer of an acid gelatin-blank film of the type disclosed in Example I.

A second sample was soaked for 2 minutes in an aqueous solution containing 10 grams of sodium dodecyl sulfate in 100 cc. of water and then for 1 minute in a solution made by adding 10 grams of sodium dodecyl sulfate, 60 cc. of 95% ethanol and 2 cc. of glacial acetic acid to a sufficient amount of water to make 100 cc. of solution. The film was agitated during the soaking period and then rolled into contact with an acid gel-blank and later stripped after the manner described in Example I.

A third sample of the dried film was treated in the same manner as the second sample except that 10 grams of sodium dodecyl sulfate in each solution were replaced by 33 cc. of a 30% aqueous solution of sodium octyl sulfate.

A fourth sample of the dried film was treated in the same way as the second sample except that 10 grams of sodium dodecyl sulfate in each solution were replaced by 20 grams of a mixture of higher primary and secondary alkane sulfonic acids predominating in secondary alkane sulfonic acids of 15 to 16 carbon atoms.

A fifth sample of the dried film element was treated in the same manner as the second sample except that the 10 grams of sodium dodecyl sulfate were replaced by 10 grams of a mixture of sodium alkane sulfonates of 8 to 10 carbon atoms.

A sixth sample of the dried film was treated in the same way as the second sample except that the 10 grams of sodium dodecyl sulfate were replaced by 10 grams of sodium tetralin sulfonate. The outer layer of the 2nd, 3rd, 4th, 5th, and 6th samples after transfer to the gelatin-blank film were readily stripped from the remaining image-bearing layer of the front film due to the resolubilizing character of the baths. There was no perceptible resolubilizing in the first bath and stripping transfer could not be effectively carried out. The anchorage in the 2nd, 3rd, and 6th samples was especially good.

EXAMPLE IV

A photographic stripping film similar to that of Example I was processed as follows:

(1) Developed for 15 minutes at 68° F. in the developer of Example I.

(2) Fixed for 15 minutes at 68° F. in a fixing bath of the following composition:

| | | |
|---|---|---|
| Water (125° F.) | cc. | 750 |
| Hypo | g. | 300 |
| Sodium sulfite, desiccated | g. | 11 |
| Acetic acid, glacial | cc. | 17 |
| Potassium alum | g. | 10 |

Cold water to make 1 liter.

(3) Washed for a period of 5 minutes in cold running water.

(4) Dried quickly.

The dried film was then treated in the manner described in Example I to transfer the outer image-bearing layer to a separate gelatin-blank film. The potassium alum in the fixing bath insolubilized the stripping layer and prevented detachment of the upper layer during washing. The stripping layer was resolubilized by the bath described in Example I. There was good adherence between the outer gelatin layer and the gelatin layer of the gelatin-blank film, and the transferred layer was readily stripped from the lower layer. Somewhat more rapid resolubilization was attained with a bath containing both the anionic wetting agent and citric acid in the amount of 15 grams per liter.

EXAMPLE V

A film similar to that of Example I was processed as follows:

(1) Developed for 15 minutes at 68° F. in same developer as Example I.

(2) Fixed for 15 minutes at 68° F. in hardening fixer of following composition:

| | | |
|---|---|---|
| Water (125° F.) | cc. | 750.0 |
| Hypo | g. | 300.0 |
| Sodium sulfite, desiccated | g. | 11.0 |
| Acetic acid, glacial | cc. | 17.0 |
| Potassium alum | g. | 10.0 |

Cold water added to make 1.0 liter.

(3) Washed 5 minutes in cold running water.

(4) Dried quickly.

(5) Dried film transferred after the manner described in Example III with similar results.

The following example illustrates the use of insolubilizing or hardening agents for the sodium-o-sulfobenzaldehyde acetal stripping layer prior to coating. It eliminates an insolubilizing treatment during processing, e. g., after fixing.

EXAMPLE VI

A cellulose nitrate film base having a thin gelatin coating was coated to a weight of 52 mg. AgBr per sq. dec. with a gelatino-silver iodobromide emulsion which had admixed therewith 50% by weight based on the silver salt of yellow colloidal silver. A mixture of 100 parts of 100% hydrolyzed polyvinyl acetate (medium viscosity—molecular weight 15,000 to 20,000), 1,080 parts ethylene glycol, 73 parts of sodium-o-sulfobenzaldehyde monohydrate, and 9 parts 100% phosphoric acid is stirred at 80° C. for 1 hour and then precipitated with 100,000 parts acetone and dried to give 142 parts of a white solid. A solution containing 200 grams of this acetal in 4,000 grams of 10% ethanol was digested 45 minutes at 125° F. and cooled to 90° F.

The solution was then adjusted to pH 6.0 and 40 cc. of 10% saponin were added. The solution was then split into four equal portions A, B, C, and D.

Portion A was coated on the emulsion side of a sample of the above film in a layer 0.0001 to 0.0003 inch thick as a control with no further additions. To the remaining portions the indication amounts of 10% aqueous chrome alum solution were added:

| Portion: | Cubic centimeters |
|---|---|
| B | 25 |
| C | 50 |
| D | 100 |

and samples of the above film were coated on the emulsion side with these solutions in layers 0.0001 to 0.0003 inch thick.

All of the samples were then coated with a gelatino-silver iodobromide emulsion containing 1,1'-diethyl-2,2'-cyanine iodide to a weight of 48 mg. AgBr per sq. dec.

These film elements were processes as described in Example I, steps (1) to (5) except that step (3) was omitted. During the washing step the stripping layer of the control film (A) softened, allowing the ortho emulsion layer to blister and become detached from the lower emulsion layer. Films made from portions B, C, and D, however, all exhibited firm attachment during all processing steps.

However, when they were bathed in a solution of the following composition:

| | Grams |
|---|---|
| Sodium dodecyl sulfate (dry) | 25.0 |
| Sodium tetralin sulfonate | 25.0 |
| Monosodium dihydrogen phosphate monohydrate | 5.0 |
| Citric acid (U. S. P.) | 16.0 |
| Water to make 1.0 liter. | |
| Phosphoric acid 85% to lower pH to 2.0. | |

the stripping layers dissolved readily and permitted the ortho emulsion layers to be detached.

The resulting front film element was processed and stripped, as described in Example I, except that step (3) was eliminated with similar results.

EXAMPLE VII

The process of Example II was thrice repeated by substituting for the transfer bath of such example one of the following baths A and B and a third bath made by mixing 500 cc. of the two baths.

*Bath A*

| | Grams |
|---|---|
| Sodium dodecyl sulfate, dry | 50.0 |
| Monosodium dihydrogen phosphate·$1H_2O$ | 5.0 |
| Citric acid (U. S. P.) | 16.0 |
| Water to make 1.0 liter. | |
| 85% phosphoric acid added to lower pH to 2.0. | |

*Bath B*

| | Grams |
|---|---|
| Sodium tetralin sulfonate | 50.0 |
| Monosodium dihydrogen phosphate·$1H_2O$ | 5.0 |
| Citric acid (U. S. P.) | 16.0 |
| Water to make 1.0 liter. | |
| 85% phosphoric acid added to lower pH to 2.0. | |

Bath B was found to be faster acting than A requiring only 45 seconds to soften the film preparatory to rolling in contact with the acid gel-blank. However, the anchorage to the gel-blank was somewhat less than with Bath A.

The mixed bath was rapid-acting and had excellent anchorage characteristics.

EXAMPLE VIII

Samples of a film element of the type disclosed in Example I were processed by each of the five steps described in that example, soaked for 20 to 30 seconds in the following transfer solutions at 70° F. and then rolled in contact with an acid gel-blank after the manner set forth in that example.

*Bath-1*

Phosphoric acid 4 cc. 85% diluted to 260 cc. with distilled water and having a pH of about 1.7.

*Bath-2*

Phosphoric acid 4 cc. 85% plus 15 grams of a mixture of primary and secondary higher alkane sulfonic acid sodium salts predominating in secondary alkane monosodium sulfonates of 15 to 16 carbon atoms and distilled water to 250 cc. of solution. This solution had a pH of 2.05.

*Bath-3*

Phosphoric acid 4 cc. 85% plus 35 cc. of a 30% aqueous mixture of sodium alkane sulfonates of 8 to 10 carbon atoms and distilled water to 250 cc., said solution having a pH of 1.7.

Bath-1 produced poor anchorage of the transferred image-bearing layer to the gelatin-blank film. Bath-2 had anchorage greatly superior to Bath-1 while Bath-3 was intermediate in properties.

In place of the anionic wetting agents described in the above examples, there may be substituted a large number of other specific wetting agents of this type. Suitable agents include the sodium potassium and ammonium salts of decyl, dodecyl, tetradecyl, hexadecyl, octadecyl and oleyl sulfate; the triethanolamine, triethylamine, cyclohexylamine, piperidine, and tetraethylammonium salts of such sulfates; and mixtures of any two or more of such salts. A good commercial mixture is composed of the sodium salts obtained by sulfating the mixture of alcohols obtained by the hydrogenation of coconut oil. Sodium potassium and ammonium isopropyl naphthalene sulfonates are also useful.

The sodium dodecyl sulfate used in the foregoing examples was electrolyte free but contained minor amounts of other sodium n-alkyl sulfates of 10 to 18 carbon atoms being made by sulfating a fraction of the higher alcohols obtained from coconut oil as described above.

The pH of the transfer solutions can readily be regulated by the addition of buffering agents. In addition to those of the examples there may be used potassium acid phthalate, potassium acid tartrate, sodium citrate, sodium tartrate, and sodium lactate.

Similarly, in place of the specific sequestering agents which are referred to above, there may be substituted similar amounts of other agents of this type. Among such additional agents which can be used in place of, or in admixture with, the $\alpha$-hydroxy aliphatic carboxylic acids, e. g., lactic, citric, tartaric, or oxalic acids are sodium hexametaphosphate, glycerine, ethylene glycol, urea, sorbitol, thiosorbitol, and 5% aqueous sucrose. The latter materials, however, are rather weak sequestering agents for metal ions, e. g., aluminum.

In place of the specific film elements described in Example I, there may be substituted various other film elements having similar polyvinyl acetal sulfonic acid or carboxylic acid compound stripping layers. Among such acetals are those described in German Patent 643,650 and U. S. Patent 2,310,943. The free acids of such acetals can be converted into water-soluble salt groups by a simple neutralization. To be more specific, they can be neutralized or made slightly basic (pH 7–9) by salt formation with alkali metals, ammonia, or amines which form water-soluble salts, e. g., mono-, di-, and tri-methylamine, mono-, di-, and tri-ethylamine, piperidine, cyclohexylamine, ethylenediamine-1,2, hexamethylenediamine-1,6, piperazine, morpholine, etc. Neutral or slightly basic (pH 8–9) solutions or dispersions are advantageous because of their freedom from effect on the emulsions and their ability to neutralize any acidic materials that may be released by the support through decomposition. Moreover, they are more stable than the acidic solutions or dispersions.

Partially and completely hydrolyzed polyvinyl alcohols of low, intermediate, and high viscosity having a molecular weight of 5,000 to 50,000 and hydrolyzed interpolymers of vinyl esters with one or less equivalent of a terminally unsaturated interpolymerizable organic compound can be used in preparing the hydrophilic vinyl alcohol acetals of aldehydes containing carboxylic or sulfonic acid groups. In general, such polymers having for each 100 carbon atoms between 20 and 50 free non-phenolic hydroxyl groups are useful.

The preferred hydrophilic macromolecular acetals of vinyl alcohol polymers used in the films treated in accordance with this invention are prepared by acetalization from (1) polyvinyl alcohol of high molecular weight (viscosity of 4% aqueous solution at 20° C., 40 to 60 centipoises), (2) polyvinyl alcohol of medium molecular weight (viscosity of 4% aqueous solution at 20° C., 15 to 30 centipoises) substituted on 0 to 30% of the hydroxyl groups with ester groups, e. g., acetate, propionate groups, acetal groups, e. g., formal, acetal, propional, butyral, and benzal groups, and (3) 75–100% hydrolyzed interpolymers of vinyl acetate with 0.05 to 0.5 mol equivalents of terminally unsaturated mono-olefins, e. g., ethylene, such as described in United States Patent 2,386,347, and (4) completely hydrolyzed interpolymers of vinyl acetate with minor proportions (less than 50%) of polymerizable vinyl or vinylidene compounds, for example, vinyl chloride, vinyl cyanide, alkyl methacrylates, e. g., methyl and ethyl methacryalte, etc., with an aldehyde containing free carboxylic or sulfonic acid groups or water-soluble salts of such groups.

The degree of substitution of the acetal groups may vary over a considerable range. Thus, vinyl alcohol polymers having between 10 and 50% of the hydroxyl groups acetalized with the aforedescribed aldehydes have been found useful. However, it has been found that the best results are obtained when between 10 and 35% of the hydroxyl groups are acetalized with the aldehydes. The total acetal content based on these figures will vary depending on the hydroxyl content of the polymer, but it has been found that the best results are obtained when between 5 and 17% of the carbon atoms of the polymer chain contain the acetal groups with a —COO— or $—SO_3—$ radical. The acetals having this degree of substitution may be used in the form of the free acids but are preferably used in the form of the water-soluble salts which are soluble to the extent of at least 5% at temperatures below 30° C. in methanol or ethanol containing up to 50% of water.

The stripping layers need not be wholly composed of the water-soluble polyvinyl acetals described above which contain a solubilizing COOZ or $SO_3Z$ group. However, such polymers constitute the eccential and predominant part of the stripping layers. There may be mixed with such acetals water-soluble or hydrophilic hydroxyl polymers, e. g., polyvinyl alcohol of low, medium, or high viscosity, or partially hydrolyzed vinyl esters, polyvinyl acetate and polyvinyl chloracetate, polyvinyl acetals of formaldehyde, ethylaldehyde, benzaldehyde, etc., wherein there is sufficient free hydroxyl groups to confer water-soluble or hydrophilic properties.

Thus, in place of the specific polymeric acetals of the vinyl alcohol of the example, there may be substituted similar acetals of other aldehydes containing carboxylic and/or sulfonic acid groups. Suitable additional aldehydes include aliphatic sulfoaldehydes of the formula $$HSO_3(CH_2)_nCHO$$

where $n$ is 2 to 10, e. g., beta-sulfopropionaldehyde, aliphatic carboxyaldehydes of the formula $HOOC(CH_2)_nCHO$, where $n$ is 2 to 10, e. g., beta-formylpropionic acid; benzaldehyde-parasulfonic acid, terephthaldaldehyde acid, p-(beta-formylethyl)-benzoic acid and o-carboxymethoxybenzaldehyde.

The present invention has the advantage that it provides a novel and practical method of temporarily insolubilizing a water-soluble stripping layer. This temporary insolubilization is of importance in commercial photographic processing laboratories in that it permits one to carry out the stripping operation in a different room from that in which the chemical photographic processing, e. g., developing and fixing, is carried out. This means that the equipment used in the stripping operation will be free from the corrosive and toxic conditions which are present in developing rooms.

A further advantage of the invention is that it gives the technician more latitude in the stripping operation. The stripping speed can be controlled at the will of the technician. Hence, if a certain area of a film needs a special treatment this can be readily accomplished since the stripping rate can be varied without interfering with the development operation. Moreover, the stripping operation can be carried out under well-illuminated conditions thus permitting the operator to carefully follow the stripping of each frame.

An additional advantage in the invention is that complete processing of the front film can be accomplished while retaining adherence between the image-bearing records. A master positive print of the two superposed records can be made before removing the outer record. Hence, this record can be reformed from the master positive print in the event of damage or loss of the outer layer during transferring it to another base, and stripping. A further advantage is that the stripping operations can be carried out at a central laboratory while production companies on location can process and view each day's exposures and edit them before stripping.

As many widely different embodiments of this invention can be made without departing from the spirit and scope thereof, it is to be understood that the invention is not to be limited except as defined by the claims.

What is claimed is:

1. The process which comprises developing an exposed photographic film element having superposed thereon two latent image-bearing gelatino silver halide emulsion layers which are separated by a stripping layer consisting essentially of a water-soluble macromolecular acetal of a hydroxyl polymer having a plurality of recurring intralinear $$-CH_2-\overset{|}{C}HOH$$

groups with an aldehyde containing a solubilizing group taken from the class consisting of —COOZ and $—SO_3Z$ where Z is a member taken from the group consisting of hydrogen and a water-soluble salt-forming cation, which aldehyde is otherwise unsubstituted, fixing said element, treating said element in an aqueous solution containing a water-soluble inorganic polyvalent metal gelatin-hardening agent which yields metal ions having a valence of 3 to 4 to reduce the water solubility of the acetal layer, washing the resulting element and drying the same, subsequently resolubilizing said layer by treating it in an aqueous bath having a pH of about 2.0 to 3.0 containing an anionic surface active wetting agent, pressing the outer image-bearing layer of said element into contact with a film bearing a gelatin layer and stripping the image-bearing layer adhering to said gelatin layer from the remainder of said exposed photographic film.

2. The process which comprises developing an exposed photographic film element having superposed thereon two latent image-bearing gelatino silver halide emulsion layers which are separated by a stripping layer consisting essentially of a water-soluble macromolecular acetal of a hydroxyl polymer having a plurality of recurring intralinear $$-CH_2-\overset{|}{C}HOH$$

groups with an aldehyde containing a solubilizing group taken from the class consisting of —COOZ and —$SO_3Z$ where Z is a member taken from the group consisting of hydrogen and a water-soluble salt-forming cation, which aldehyde is otherwise unsubstituted, fixing said element, treating said element in an aqueous solution containing aluminum chloride, washing the resulting element and drying the same, subsequently resolubilizing said layer by treating it in an aqueous bath having a pH of about 2.0 to 3.0 containing an anionic surface active wetting agent, pressing the outer image-bearing layer of said element into contact with a film bearing a gelatin layer and stripping the image-bearing layer adhering to said gelatin layer from the remainder of said exposed photographic film.

3. The process which comprises developing an exposed photographic film element having superposed thereon two latent image-bearing gelatino silver halide emulsion layers which are separated by a stripping layer consisting essentially of a water-soluble macromolecular acetal of a hydroxyl polymer having a plurality of recurring intralinear $$-CH_2-\overset{|}{C}HOH$$

groups with an aldehyde containing a solubilizing group taken from the class consisting of —COOZ and —$SO_3Z$ where Z is a member taken from the group consisting of hydrogen and a water-soluble salt-forming cation, which aldehyde is otherwise unsubstituted, fixing said element, treating said element in an aqueous solution containing aluminum chloride, washing the resulting element and drying the same, subsequently resolubilizing said layer by treating it in an aqueous bath having a pH of about 1.0 to 4.5 containing an anionic surface active wetting agent and an aluminum ion sequestering aliphatic carboxylic acid, pressing the outer image-bearing layer of said element into contact with a film bearing a gelatin layer and stripping the image-bearing layer adhering to said gelatin layer from the remainder of said exposed photographic film.

4. A process as set forth in claim 3 wherein said wetting agent is sodium dodecyl sulfate and said sequestering acid is lactic acid.

5. The process which comprises developing an exposed photographic film element having superposed therein two latent image-bearing gelatino silver halide emulsion layers which are separated by a stripping layer consisting essentially of a water-soluble sodium-o-sulfobenzaldehyde acetal of polyvinyl alcohol, fixing said element, treating said element in an aqueous solution containing a water-soluble inorganic polyvalent metal gelatin-hardening agent which yields metal ions having a valence of 3 to 4 to reduce the water solubility of the acetal layer, washing the resulting element and drying the same, subsequently resolubilizing said layer by treating it in an aqueous bath having a pH of about 1.0 to 4.5 containing an anionic surface active wetting agent, pressing the outer image-bearing layer of said element into contact with a film bearing a gelatin layer and stripping the image-bearing layer adhering to said gelatin layer from the remainder of said exposed photographic film.

6. The process which comprises developing an exposed photographic film element having superposed thereon two latent image-bearing gelatino silver halide emulsion layers which are separated by a stripping layer consisting essentially of a water-soluble sodium-o-sulfobenzaldehyde acetal of polyvinyl alcohol, fixing said element, treating said element in an aqueous solution containing aluminum chloride, washing the resulting element and drying the same, subsequently resolubilizing said layer by treating it in an aqueous bath having a pH of about 1.0 to 4.5 containing an anionic surface active wetting agent, pressing the outer image-bearing layer of said element into contact with a film bearing a gelatin layer and stripping the image-bearing layer adhering to said gelatin layer from the remainder of said exposed photographic film.

7. A process as set forth in claim 5 wherein the gelatin layer of the second film contains an acid.

8. The process which comprises developing an exposed photographic film element having superposed thereon two latent image-bearing gelatino silver halide emulsion layers which are separated by a stripping layer consisting essentially of a water-soluble macromolecular acetal of a hydroxyl polymer having a plurality of recurring intralinear $$-CH_2-\overset{|}{C}HOH$$

groups with an aldehyde containing a solubilizing group taken from the class consisting of —COOZ and —$SO_3Z$ where Z is a member taken from the group consisting of hydrogen and a water-soluble salt-forming cation, which aldehyde is otherwise unsubstituted, fixing said element, treating said element in an aqueous solution containing aluminum chloride, washing the resulting element and drying the same, subsequently resolubilizing said layer by treating it in an aqueous bath having a pH of about 1.0 to 4.5 containing an anionic surface active wetting agent and an aluminum ion sequestering aliphatic carboxylic acid, pressing the outer image-bearing layer of said element into contact with a film bearing a layer of gelatin containing an acid and stripping the image-bearing layer adhering to said gelatin layer from the remainder of said exposed photographic film.

9. The process which comprises developing an exposed photographic film element having superposed thereon two latent image-bearing gelatino silver halide emulsion layers which are separated by a stripping layer consisting essentially of a water-soluble macromolecular acetal of a hydroxyl polymer having a plurality of recurring intralinear $$-CH_2-\overset{|}{C}HOH$$

groups with an aldehyde containing a solubilizing group taken from the class consisting of —COOZ and —$SO_3Z$ where Z is a member taken from the group consisting of hydrogen and a water-soluble salft-forming cation, which aldehyde is otherwise unsubstituted, fixing said element, treating said element in an aqueous solution containing aluminum chloride, washing the resulting element and drying the same, subsequently resolubilizing said layer by treating it in an aqueous bath having a pH of about 1.0 to 4.5 containing a sodium dodecyl sulfate and an aluminum ion sequestering aliphatic carboxylic acid, pressing the outer image-bearing layer of said element into contact with a film bearing a layer of gelatin containing an acid and stripping the image-bearing layer adhering to said gelatin layer from the remainder of said exposed photographic film.

10. The process which comprises developing an exposed photographic film element having superposed thereon two latent image-bearing gelatino silver halide emulsion layers which are separated by a stripping layer consisting essentially of a water-soluble macromolecular acetal of a hydroxyl polymer having a plurality of recurring intralinear $$-CH_2-\overset{|}{C}HOH$$

groups with an aldehyde containing a solubilizing group taken from the class consisting of —COOZ and —$SO_3Z$ where Z is a member taken from the group consisting of hydrogen and a water-soluble salt-forming cation, which aldehyde is otherwise unsubstituted, fixing said element, treating said element in an aqueous solution containing aluminum chloride, washing the resulting element and drying the same, subsequently resolubilizing said layer by treating it in an aqueous bath having a pH of about 1.0 to 4.5 containing an anionic surface active wetting agent and an aluminum ion sequestering agent, pressing the outer image-bearing layer of said element into contact with a film bearing a gelatin layer and stripping the image-bearing layer adhering to said gelatin layer from the remainder of said exposed photographic film.

11. The process which comprises developing an exposed photographic film element having superposed thereon two latent image-bearing gelatino silver halide emulsion layers which are separated by a stripping layer consisting essentially of a water-soluble macromolecular acetal of a hydroxyl polymer having a plurality of recurring intralinear $$-CH_2-\overset{|}{C}HOH$$

groups with an aldehyde containing a solubilizing group taken from the class consisting of —COOZ and —$SO_3Z$ where Z is a member taken from the group consisting of hydrogen and a water-soluble salt-forming cation, which aldehyde is otherwise unsubstituted, fixing said element, and washing the element, characterized in that after the developing step and prior to the washing step the developed element is treated in an aqueous solution containing a water-soluble inorganic polyvalent metal gelatin-hardening agent which yields metal ions having a valence of 3 to 4 to reduce the water solubility of the acetal layer, drying the washed element subsequently resolubilizing said layer by treating it in an aqueous bath having a pH of about 2.0 to 3.0 containing an anionic surface active wetting agent, pressing the outer image-bearing layer of said element into contact with a film bearing a gelatin layer and stripping the image-bearing layer adhering to said gelatin layer from the remainder of said exposed photographic film.

12. The process which comprises developing an exposed photographic film element having superposed thereon two latent image-bearing gelatino silver halide emulsion layers which are separated by a stripping layer consisting essentially of a water-soluble macromolecular acetal of a hydroxyl polymer having a plurality of recurring intralinear $$-CH_2-\overset{|}{C}HOH$$

groups with an aldehyde containing a solubilizing group taken from the class consisting of —COOZ and —$SO_3Z$ where Z is a member taken from the group consisting of hydrogen and a water-soluble salt-forming cation, which aldehyde is otherwise unsubstituted, fixing said element in an aqueous solution containing a water-soluble inorganic polyvalent metal gelatin-hardening agent which yields metal ions having a valence of 3 to 4 to reduce the water solubility of the acetal layer, washing the resulting element and drying the same, subsequently resolubilizing said layer by treating it in an aqueous bath having a pH of about 2.0 to 3.0 containing an anionic surface active wetting agent, pressing the outer image-bearing layer of said element into contact with a film bearing a gelatin layer and stripping the image-bearing layer adhering to said gelatin layer from the remainder of said exposed photographic film.

JACOB QUENTIN UMBERGER.
ARTHUR WILLIAM GRUMBINE.

REFERENCES CITED

The following references are of record in the file of this patent:

UNITED STATES PATENTS

| Number | Name | Date |
|---|---|---|
| 2,328,034 | Sease et al. | Aug. 31, 1943 |
| 2,350,380 | White | June 6, 1944 |
| 2,397,452 | White | Mar. 26, 1946 |
| 2,462,503 | Jennings | Feb. 22, 1949 |